Patented May 24, 1949

2,471,282

UNITED STATES PATENT OFFICE 2,471,282

TREATMENT OF LIVERS

Levi Scott Paddock, Chicago, Ill., assignor to Swift & Company, Chicago, Ill., a corporation of Illinois No Drawing. Application June 16, 1945, Serial No. 599,958

3 Claims. (Cl. 99—107)

This invention relates to the treatment of meat products, and it has to do more particularly with a method of conditioning a liver product with a proteolytic enzyme for the subsequent tenderizing thereof on cooking.

Liver is an important edible product of the meat packing industry because of its nutritional value. In the last few years the importance of liver in the human diet has been recognized, especially in view of the discovery of its high vitamin content and its curative properties in the treatment of anemia, a blood deficiency disease.

Unlike any other organ of the animal body, the liver, with the exception of the lungs, has a peculiar vascular system, the blood vessels being large and thick-walled. These blood vessels, entering the liver organ at a cleft, via the portal fissure, found at the top center of the organ, divide and branch throughout the mass of the liver substance. Because of an abundance of blood vessel tissue in the liver, especially near the portal fissure, certain portions of the liver are hard and rubbery upon mastification when the chew includes a portion of a blood vessel.

It is the object of this invention, therefore, to pre-treat the liver to enable tenderization of the blood vessels that cause the hardness on chewing by means of a proteolytic enzyme, such as bromelin, trypsin or papain, at the same time preventing the enzyme from escaping into the lever tissue which is already sufficiently tender.

It has been known heretofore that meat products could be quick cured by introducing a curing agent into the vascular system. However, the introduction of an enzyme solution by means of pumping as in quick curing causes a bursting or puncturation of the blood vessels and the consequent escape of the enzyme solution into the meat tissue of the liver, thus effecting an over-tenderization thereof.

The present invention provides a practical method for the introduction of the enzyme which on cooking of the liver tenderizes the blood vessel tissue and leaves the remainder of the liver substance unaffected. Broadly the invention contemplates subjecting the liver to the action of the enzyme solution while under vacuum whereby the solution contacts the vascular tissue without substantially affecting the meat tissue.

One method of practicing the invention is to charge the liver product and the enzyme solution to a vacuumized container. The container may be equipped with a vacuum gauge, an evacuating pump, and other necessary equipment for releasing the vacuum and for providing access to the container.

Good results are obtained if the concentration of the enzyme falls within the range of 0.01 to 0.1 per cent. Optimum results are manifested at a concentration of approximately 0.04 to 0.08 percent of the enzyme.

To the enzyme solution may be added curing materials, such as salt, sodium nitrate and sodium nitrite. Salt alone may be included in the bath solution if no particular color properties of the final product are sought. By the incorporation of 5 to 25 per cent of salt in the bath solution, substantial curing may be obtained. In addition to the curing function, the salt often stimulates the activity of the enzyme.

As vacuum is applied to the system, the air leaving the liver bubbles up through the solution at a rapid rate, while at the same time the large blood vessels open up and become distended. During the evacuating process and on release of the vacuum, some enzyme trickles into the distended blood vessels. A vacuum of between 20 to 30 inches may be used. Good results are obtained at a vacuum of 25 to 27 inches of mercury. The vacuum is maintained for about 10 to 30 minutes and then released.

Conveniently the enzyme is used at room temperature, although the temperature range of the solution may vary within wide limits, for example, between 40 to 115° F. However, after the liver product is withdrawn from the vessel and the surface thereof washed free of enzyme by means of water, if not used immediately, the liver product should be refrigerated in order to arrest any enzyme activity affecting the strength of the blood vessels, and to maintain the enzyme associated with the blood vessels in a dormant state until such time as the liver product is to be cooked. During the cooking the enzyme within the blood vessels is reactivated by the heat in the cooking process, and it is at this time that a substantial tenderization of the blood vessels occurs. Refrigeration temperatures depend on the length of storage. Temperatures of approximately 36 to 38° F. may be employed where a short period of storage is contemplated. If the storage time is to exceed 7 to 10 days, it is preferred that the liver product be frozen.

The following examples of methods of operating are given for the purpose of illustrating the present invention, but they are not intended to be limiting on the scope thereof.

*Example I*

A fresh cow liver weighing approximately 8½ pounds is placed in a vacuum vessel. A sufficient amount of an 0.08 per cent papain water solution to cover the liver is added. Air is subsequently exhausted from the vessel until a vacuum of 27 inches of mercury is obtained, and which is maintained for 20 minutes. The vacuum is then slowly released, and the liver product withdrawn.

*Example II*

A fresh cow liver weighing approximately 9 pounds is immersed in an enzyme salt bath composed of 0.08 per cent papain, 10 per cent salt, and the remainder, water. The level of the solution is kept 1 to 2 inches above the surface of the liver. A vacuum of 25 to 27 inches of mercury is obtained and is kept for 10 minutes after which it is released and the treated liver withdrawn.

*Example III*

An enzyme salt solution comprising 0.08 per cent papain, 10 per cent salt and 0.1 sodium nitrite is placed in a vacuum jar and a chilled liver weighing 9¾ pounds is immersed therein. A vacuum of 25 to 27 inches of mercury is then obtained and held for 15 minutes, after which it is released, and the liver product withdrawn and the surface thereof washed free of enzyme solution.

Obviously many modifications and variations of the invention, as hereinbefore set forth, may be made without departing from the spirit and scope thereof, and therefore only such limitations should be imposed as are indicated in the appended claims.

I claim:

1. A process for conditioning the blood vessels of an animal liver with a proteolytic enzyme for the tenderization thereof without affecting the meat tissue of the liver which comprises essentially the steps of immersing an animal liver characterized by having an outer layer of connective tissue and a network of tough, thick-walled blood vessels in a solution of a proteolytic enzyme in a confined zone, subjecting the immersed liver to a vacuum of between approximately 20 to 30 inches of mercury to open and distend the blood vessels, and releasing the said vacuum so as to allow the proteolytic enzyme solution to enter the distended blood vessels without rupture of said vessels, whereby the enzyme becomes associated with the tough blood vessels without contacting the said meat tissue of the liver.

2. A process for conditioning the blood vessels of an animal liver with a proteolytic enzyme for the tenderization thereof without affecting the meat tissue of the liver which comprises essentially the steps of immersing an animal liver characterized by having an outer layer of connective tissue and a network of tough, thick-walled blood vessels in a solution of a proteolytic enzyme in a confined zone, said enzyme solution having a concentration between approximately 0.01 and 0.1 per cent, subjecting the immersed liver to a vacuum of between approximately 20 to 30 inches of mercury for a period of between 10 to 30 minutes to open and distend the blood vessels, and releasing the said vacuum so as to allow the proteolytic enzyme solution to enter the distended blood vessels without rupture of said vessels, whereby the enzyme becomes associated with the tough blood vessels without contacting the said meat tissue of the liver.

3. A process for conditioning the blood vessels of an animal liver with a proteolytic enzyme for the subsequent tenderization thereof on cooking without affecting the meat tissue of the liver which comprises essentially the steps of immersing an animal liver characterized by having an outer layer of connective tissue and a network of tough, thick-walled blood vessels in a solution of a proteolytic enzyme in a confined zone, said enzyme solution having a concentration between approximately 0.01 and 0.1 per cent, subjecting the immersed liver to a vacuum of between approximately 20 to 30 inches of mercury for a period of between 10 to 30 minutes to open and distend the blood vessels, releasing the said vacuum so as to allow the proteolytic enzyme solution to enter the distended blood vessels without rupture of said vessels, whereby the enzyme becomes associated with the tough blood vessels without contacting the said meat tissue of the liver, and thereafter maintaining the said enzyme in a dormant state until the liver is cooked to tenderize the said blood vessels.

LEVI SCOTT PADDOCK.

REFERENCES CITED

The following references are of record in the file of this patent:

UNITED STATES PATENTS

| Number | Name | Date |
|---|---|---|
| 4,035 | Scherpf | May 7, 1845 |
| 1,936,074 | Tressler et al. | Nov. 21, 1933 |
| 2,140,781 | Allen | Dec. 20, 1938 |

FOREIGN PATENTS

| Number | Country | Date |
|---|---|---|
| 166,927 | Great Britain | July 20, 1921 |
| 413,183 | Great Britain | July 12, 1934 |